United States Patent
Lim

(12) 
(10) Patent No.: US 6,525,925 B1
(45) Date of Patent: Feb. 25, 2003

(54) HEAT SHIELDING PLATE FOR CATHODE RAY TUBE OF MONITOR

(75) Inventor: Seon-Woo Lim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 38 days.

(21) Appl. No.: 09/662,343

(22) Filed: Sep. 14, 2000

(30) Foreign Application Priority Data

Oct. 19, 1999 (KR) ............................................ 99-45399

(51) Int. Cl.$^7$ .................................................. G06F 1/16

(52) U.S. Cl. ........................ 361/682; 361/681; 348/787; 312/7.2

(58) Field of Search ................................. 361/682, 681; 348/787, 789, 826, 836, 839; 312/7.2

(56) References Cited

U.S. PATENT DOCUMENTS

5,990,985 A * 11/1999 Kim ............................ 348/836

* cited by examiner

Primary Examiner—Darren Schuberg
Assistant Examiner—Yean-Hsi Chang
(74) Attorney, Agent, or Firm—Robert E. Bushnell, Esq.

(57) ABSTRACT

A heat shielding plate is employed in a cathode ray tube (CRT) of a monitor which includes a front casing to which the CRT is integrally engaged, a rear cover integrally engaged with a rear surface of the front casing, and a printed circuit board (PCB) engaged to a lower portion of the front casing and mounted at a certain distance below the CRT. The heat shielding plate is mounted between the PCB and the CRT for preventing heat generated in the PCB from being transferred to the CRT, and for preventing any arc generated in the CRT from being transferred to the PCB. The display quality of the monitor is enhanced by shielding the CRT from heat generated in a PCB so as to prevent expansion of a mask in the CRT. The shield is also capable of preventing an arc generated in the CRT from being transferred to the PCB and damaging the PCB.

17 Claims, 5 Drawing Sheets

HEAT SHIELDING PLATE FOR CATHODE RAY TUBE OF MONITOR

CLAIM OF PRIORITY

This application makes reference to, incorporates the same herein, and claims all benefits accruing under 35 U.S.C. §119 from my application PLATE FOR PREVENTING A C.R.T OF MONITOR FROM HEAT filed with the Korean Industrial Property Office on Oct. 19, 1999 and there duly assigned Ser. No. 45399/1999.

BACKGROUND OF THE INVENTION

1. Technical Field

The present invention relates to a heat shielding plate for a cathode ray tube(CRT) of a monitor and, in particular, to a heat shielding plate for a CRT of a monitor which is capable of enhancing the display quality of a CRT by preventing heat of a printed circuit board (PCB) from being transferred to the CRT.

2. Related Art

Generally, in a monitor, an electrical beam is emitted from an electrical gun of a CRT based on a video signal, and the emitted electrical beam is outputted onto a fluorescent material coated on the CRT to thereby generate various colors having different brightnesses, so that it is possible to display various characters, symbols, graphics, etc.

In the latter monitor, when power is externally applied thereto by turning on a power switch, the power is applied to the PCB, and the monitor is electrically controlled. As a result, a lot of heat is generated by the PCB, and the generated heat is transferred to the CRT. More specifically, the generated heat is transferred to the lower portion of the CRT, and from there into the interior of the CRT. As a result, undesirable expansion of components (e.g., a mask) of the CRT can take place with resultant loss in picture quality of the monitor.

Furthermore, when power is applied to the CRT, an electromagnetic field is created. When dust or other foreign material is located on the outer surface of the CRT, undesirable electric arcing can result, and this can cause malfunction and/or decreased performance of the PCB located in the monitor.

SUMMARY OF THE INVENTION

Accordingly, it is an object of the present invention to provide a heat shielding plate for a CRT of a monitor the heat shielding plate being capable of enhancing a display quality of the monitor by shielding the CRT from heat generated by the PCB, thereby preventing expansion of a mask of the CRT, the heat shield also being capable of preventing an arc generated at the CRT from being transferred to the PCB.

To achieve the above objects, there is provided a monitor which includes: a front casing; a CRT integrally engaged to the front casing for displaying various characters, symbols, etc. and having an external surface on which foreign materials can be attached due to an electromagnetic field formed when external power is applied to the monitor, the attached foreign materials being ionized so as to generate an arc; a rear cover integrally engaged with a rear surface of the front casing; a PCB engaged to a lower portion of the front casing and mounted below the CRT and at a certain distance from the CRT; and a heat shielding plate mounted between the PCB and the CRT for preventing heat generated in the PCB from being transferred to the CRT, and for preventing an arc generated at the CRT from being transferred to the PCB.

The heat shielding plate includes a vertical portion engaged to a front portion of the PCB, and a slanted portion which is integral with the vertical portion, and which is mounted between the PCB and the CRT at a certain angle for shielding the CRT from heat.

The vertical portion includes at least one throughhole, and an engaging screw which passes through the throughhole and which is engaged to an engaging hole formed at a front portion of the PCB so that the heat shielding plate is integrally connected to the PCB.

Preferably, the heat shielding plate is formed of a synthetic resin having a certain elastic force, and an aluminum plate is attached to a lower portion of the heat shielding plate.

Additional advantages, objects and features of the invention will become more apparent from the description which follows.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The heat shielding plate for a CRT of a monitor according to the present invention will be explained with reference to the accompanying drawings.

Figure 1:
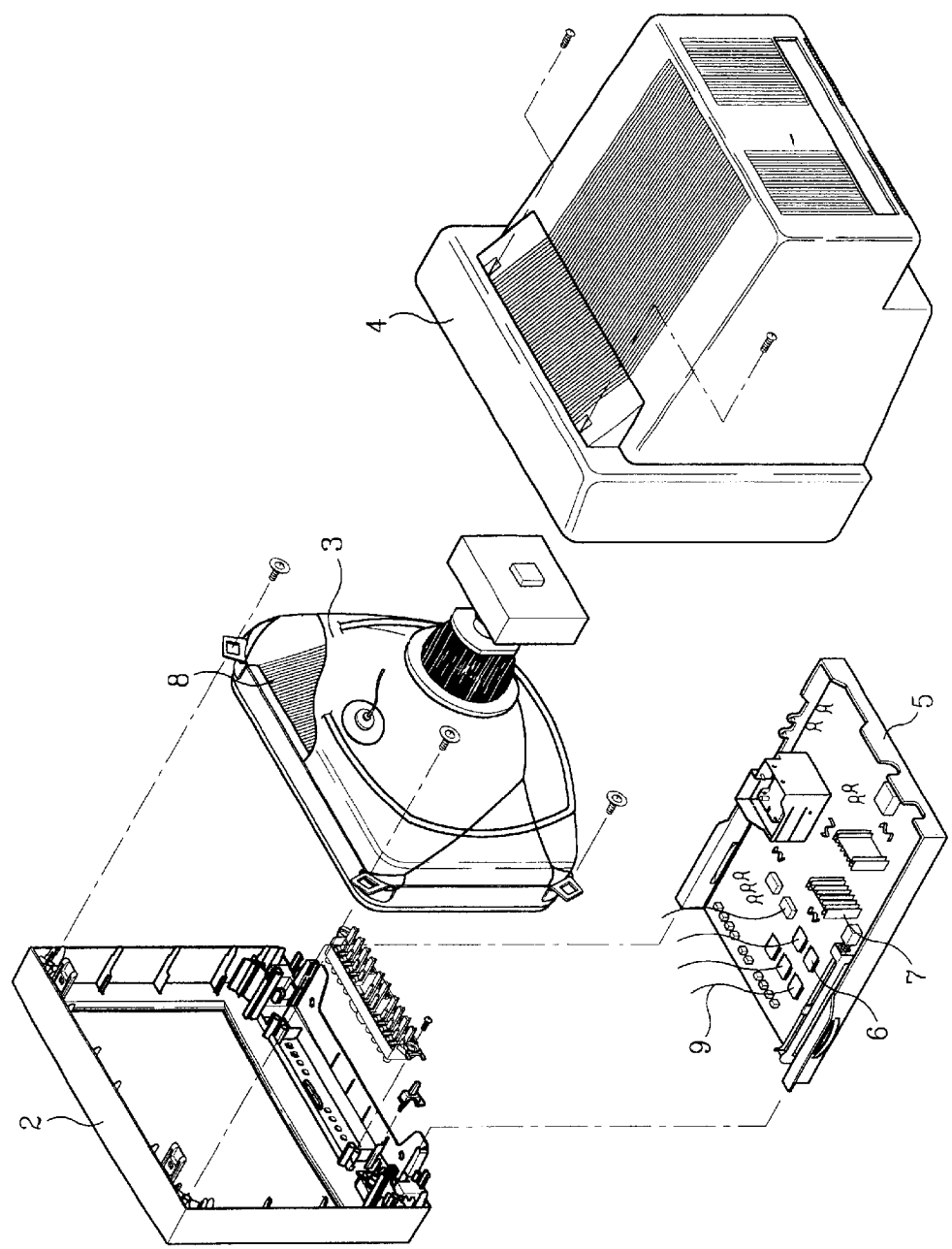
FIG. 1 is an exploded perspective view illustrating the inner construction of a monitor.

FIG. 1 is an exploded perspective view illustrating an inner construction of a monitor. As shown therein monitor 1 includes a front casing 2, a CRT 3 mounted at the front casing 2 for displaying various characters, symbols, etc., a PCB 5 for electrically controlling the monitor 1, and a rear cover 4 integrally formed with or connected to the front casing 2 and forming an outer construction of the monitor 1.

When power is applied to the monitor 1, various electrical devices 6 mounted on the PCB 5 are electrically operated. As a result, a lot of heat is generated by the electrical devices 6. In particular, a memory chip or a central processing unit (CPU) generates more heat compared to other electrical devices. The generated heat moves upwardly and is directly transferred to the lower portion of the CRT 3, and is also transferred to the outside through a heat sink 7. Moreover, the heat transferred to the CRT 3 is transferred to a mask 8 mounted in the interior of the CRT 3. The mask 8 expands as a result of this heat.

Figure 2:
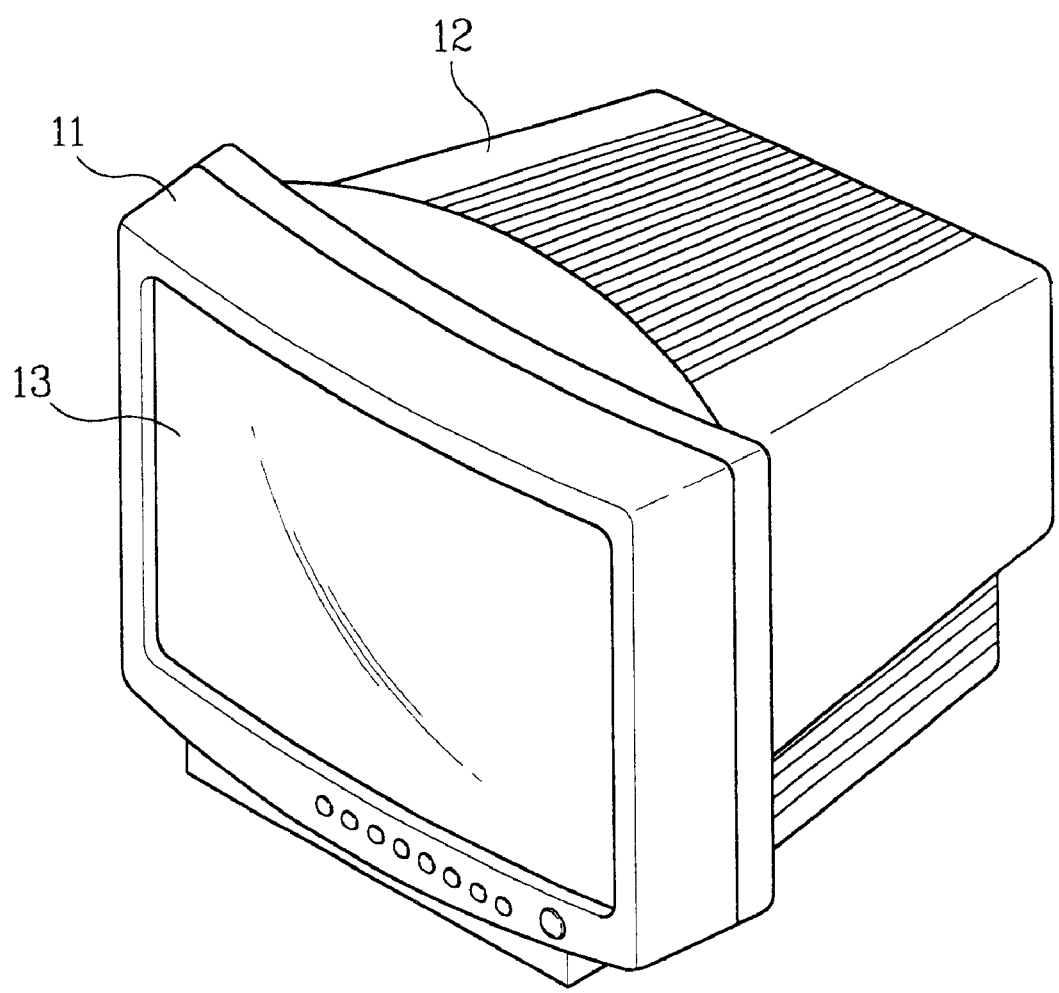
FIG. 2 is a perspective view illustrating a monitor according to the present invention.
Figure 3:
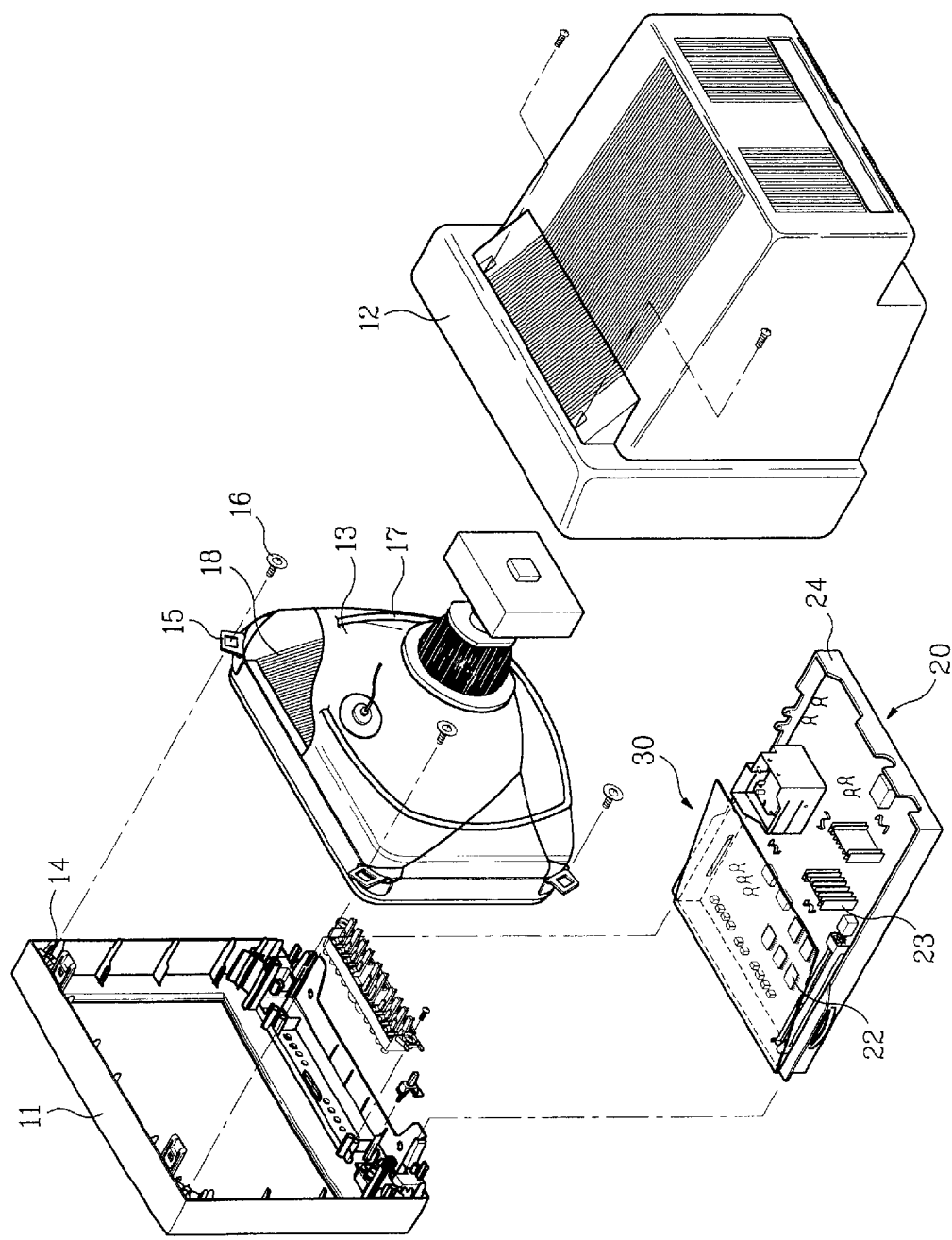
FIG. 3 is an exploded perspective view illustrating the inner construction of a monitor having a heat shielding plate for a CRT according to the present invention.

FIG. 2 is a perspective view illustrating a monitor according to the present invention, and FIG. 3 is an exploded perspective view illustrating the inner construction of a monitor having a heat shielding plate for a CRT according to the present invention.

As shown therein, a monitor 10 includes a front casing 11, a CRT 13 mounted to the front casing 11 for displaying various characters and symbols, a PCB 20 for electrically controlling the monitor 10, and a rear cover 12 integrally engaged with the front casing 11.

The front casing 11 includes four protruding bosses 14 which are formed at four corner portions, respectively. The CRT 13 is integrally engaged with the front casing 11 in such a manner that a bolt 16 which passes through a shoulder portion 15 of the CRT 13 is engaged to each boss 14.

The front surface of the CRT 13 protrudes through the front casing 11, and the rear portion of CRT 13 is formed in a conical shape and is slanted at a certain angle in the direction of the center portion thereof. In addition, a degaussing coil 17 is integrally engaged with the rear portion of the CRT 13 for degaussing an electrical magnetic field generated by the CRT 13.

The PCB 20 is integrally engaged at a lower portion of the front casing 11, and the CRT 13 is mounted at a certain height above the PCB 20. Various electrical devices 22 are mounted on the PCB 20. When power is applied to the electrical devices 22, the electrical devices 22 operate.

As a result, a lot of heat is generated by the electrical devices 22. The generated heat is transferred to the CRT 13. The CRT 13 is operated in such a state that it has a certain heat itself. In addition, a mask 18 is mounted in the interior of the CRT 13.

The heat transferred to the CRT 13 is transferred to the mask 18, and the mask 18 is thermally expanded. Expansion of the length of the mask 18 causes a decrease in display quality, so that a landing drift phenomenon occurs.

Figure 4:
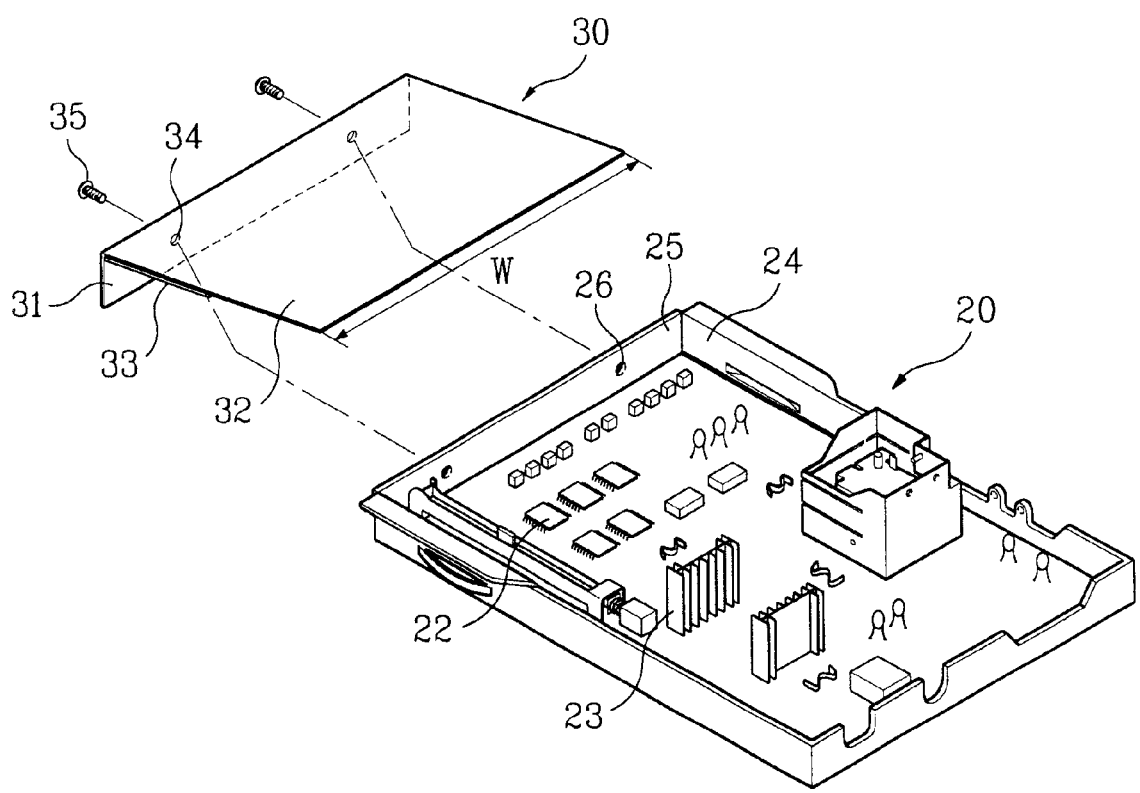
FIG. 4 is an exploded perspective view illustrating a heat shielding plate for a CRT according to the present invention.
Figure 5:
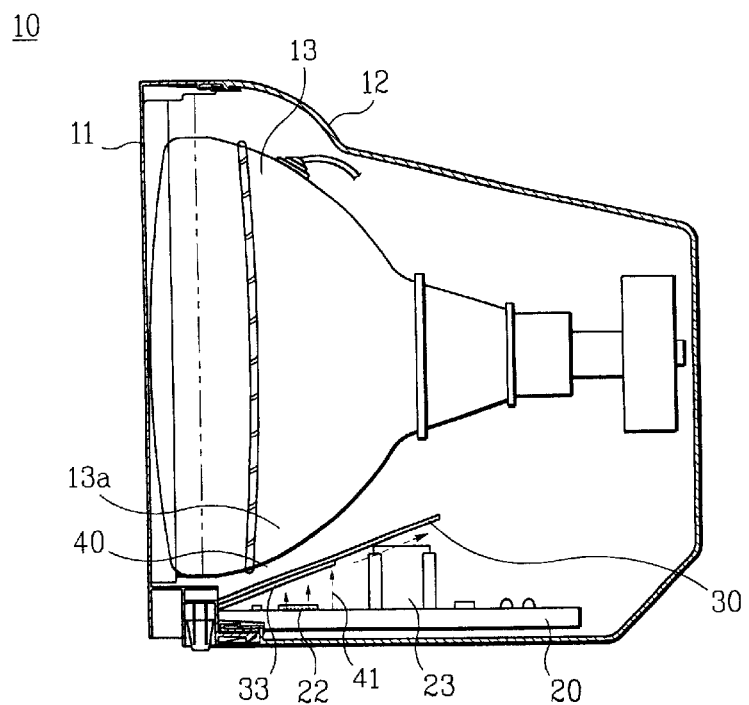
FIG. 5 is a lateral cross-sectional view illustrating a side portion of a monitor having a heat shielding plate for a CRT according to the present invention.

FIG. 4 is an exploded perspective view illustrating a heat shielding plate for a CRT according to the present invention; and FIG. 5 is a lateral cross-sectional view illustrating a side portion of a monitor having a heat shielding plate for a CRT according to the present invention.

In order to prevent the heat from being directly transferred to the lower portion 13a (see FIG. 5) of the CRT 13, a heat shielding plate 30 is mounted in CRT 13 according to the present invention. The heat shielding plate 30 will be described in more detail with reference to FIGS. 4 and 5.

As shown therein, the heat shielding plate 30 is integrally fixed to the front portion 25 of the PCB 20. Preferably, it is formed of a synthetic resin having a certain elastic force.

The heat shielding plate 30 is also, preferably, formed in a square shape, and has a width W which is the same as that of the PCB 20, so that it is possible to effectively prevent the heat of the PCB 20 from being transferred to the CRT 13.

The heat shielding plate 30 includes a vertical portion 31 integrally fixed to the front portion 25 of the frame 24 of the PCB 20, and a slanted portion 32 which is integral with the vertical portion 31 for shielding the CRT 13 from heat.

A throughhole 34 is formed in the vertical portion 31 at a certain distance, and the throughhole 34 corresponds to an engaging hole 26 formed in the front portion 25 of the frame 24 of the PCB 20. Therefore, the heat shielding plate 30 is fixed to the frame 24 of the PCB 20 when an engaging screw 35 is passed through the throughhole 34 and becomes engaged to the engaging hole 26.

In addition, an aluminum plate 33 is attached on the bottom surface of the slanted portion 32 of the heat shielding plate 30. The aluminum plate 33, preferably, has a width which is the same as the width of the slanted portion 32. Therefore, it is possible to effectively shield heat from the PCB 20.

The heat shielding plate 30 prevents an arcing phenomenon of the CRT 13. Namely, the CRT 13 operates at a high temperature, and the degaussing coil 17 of FIG. 3 forms a strong electromagnetic field at a surrounding portion of the same. Therefore, the air surrounding the CRT 13 is ionized, thereby generating an arc. The heat shielding plate 30 prevents the arc from being transferred to the electrical devices 22 of the PCB 20, so that the electrical devices 22 are safely operated.

Figure 6:
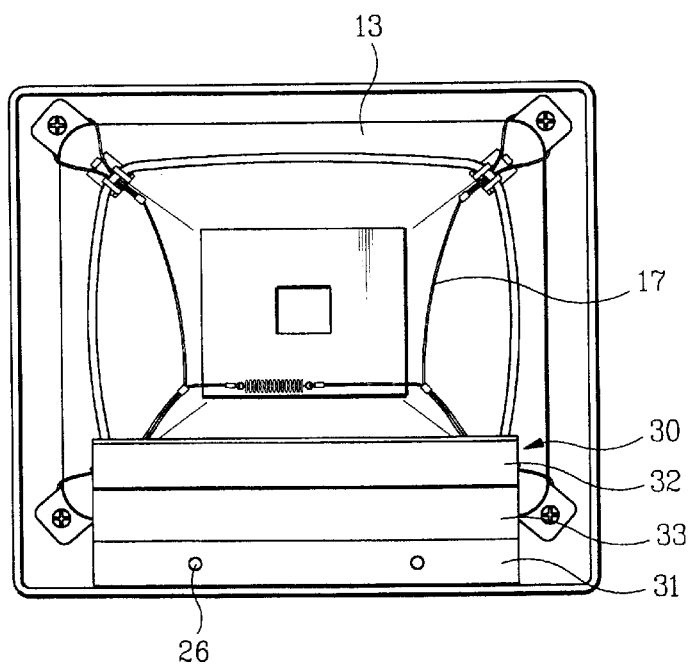
FIG. 6 is a rear view illustrating a rear side of a monitor having a heat shielding plate for a CRT according to the present invention.

The operation of the heat shielding plate for a CRT according to the present invention will now be explained with reference to the accompanying drawings, in which FIG. 6 is a rear view illustrating a rear side of a monitor having a heat shielding plate for a CRT according to the present invention.

As shown in FIGS. 3 thru 6, the heat shielding plate 30 is engaged to the frame 24 of the PCB 20. Namely, the throughhole 34 of the vertical portion 31 of the heat shielding plate 30 is aligned with the engaging hole 26 of the frame 24 of the PCB 20. In addition, the engaging screw 35 is passed through the throughhole 34 and is integrally engaged with the engaging hole 26, so that the heat shielding plate 30 is integrally engaged with the frame 24 of the PCB 20. In addition, the PCB 20 having the heat shielding plate 30 is engaged to the front casing 11.

When the PCB 20 is assembled to the front casing 11, the heat shielding plate 30 is mounted at a certain angle at the lower portion 13a of the CRT 13. The lower portion of the slanted portion 32 of the heat shielding plate 30 is supported by the heat sink 23.

When the monitor 10 is assembled, power is applied, and the electrical devices 22 of the PCB 20 operate. At this point, heat is generated by the PCB 20. The generated heat is transferred upwardly in the direction of the arrow 41 (FIG. 5) and reaches a lower portion of the heat shielding plate 30. The heat which reaches the lower portion of the heat shielding plate 30 is transferred along the heat shielding plate 30 to the rear side of the CRT 13, and is outputted to the outside.

Therefore, the heat is effectively prevented from being transferred to the CRT 13, and heat expansion of the mask 18 is prevented, thereby preventing a landing drifting phenomenon, and it is possible as a result to obtain good display quality. In addition, any arc generated in the CRT 13 is effectively blocked by the heat shielding plate 30 so that the arc is prevented from being transferred to the electrical devices of the PCB 20.

Accordingly, as a result of provision the heat shielding plate 30 for the CRT 13 of monitor 10, according to the present invention, it is possible to prevent heat expansion of the mask 18 of the CRT 13 by shielding it from heat generated by the PCB 20 so that good display quality is obtained. In addition, the electrical devices of the PCB 20 are stably operated by preventing an arc generated at a surrounding portion of the CRT 13 from being transferred to the PCB 20.

Although a preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. A monitor, comprising:

a front casing;

a cathode ray tube (CRT) integrally engaged to the front casing and having an external surface on which foreign materials are attached due to an electromagnetic field formed when external power is applied to the monitor, the attached foreign materials being ionized so as to generate an arc;

a rear cover integrally engaged with a rear surface of the front casing;

a printed circuit board (PCB) engaged to a lower portion of the front casing and mounted below, and at a certain distance from, the CRT; and a heat shielding plate mounted between the PCB and the CRT for preventing heat generated in the PCB from being transferred to the CRT and for preventing the generated arc from being transferred to the PCB.

2. The monitor of claim 1, wherein said heat shielding plate comprises:

a vertical portion engaged to a front portion of the PCB; and a slanted portion integrally connected to the vertical portion and mounted at a certain angle between the PCB and the CRT for blocking the heat generated in the PCB.

3. The monitor of claim 2, wherein said vertical portion has at least one throughhole formed therein, and wherein an engaging screw passes through the throughhole and is engaged to an engaging hole formed in the front portion of the PCB so that the heat shielding plate is integrally engaged to the PCB.

4. The monitor of claim 2, wherein said heat shielding plate is formed of a synthetic resin having a certain elastic force.

5. The monitor of claim 4, wherein said heat shielding plate further comprises an aluminum plate attached to a lower portion of said heat shielding plate.

6. A shielding plate for use in a monitor which includes a cathode ray tube (CRT) and a printed circuit board (PCB) disposed adjacent to the CRT, said shielding plate being mounted between the CRT and the PCB and comprising:

a vertical portion engaged to a front portion of the PCB; and a slanted portion integrally connected to the vertical portion and mounted at a certain angle between the PCB and the CRT for preventing operation of at least one of the PCB and the CRT from adversely affecting operation of the other.

7. The shielding plate of claim 6, wherein said vertical portion has at least one throughhole formed therein, and wherein an engaging screw passes through the throughhole and is engaged to an engaging hole formed in the front portion of the PCB so that the shielding plate is integrally engaged to the PCB.

8. The shielding plate of claim 6, wherein said shielding plate is formed of a synthetic resin having a certain elastic force.

9. The shielding plate of claim 8, wherein said shielding plate further comprises an aluminum plate attached to a lower portion of said shielding plate.

10. The shielding plate of claim 6, wherein said shielding plate comprises a heat shielding plate for blocking heat generated in the PCB from reaching the CRT.

11. The shielding plate of claim 6, wherein said shielding plate prevents an electric arc generated in the CRT from reaching the PCB.

12. In a monitor which includes a cathode ray tube (CRT) and a printed circuit board (PCB) mounted at a certain distance adjacent to the CRT, a shielding plate mounted between the PCB and the CRT for protecting at least one of the CRT and the PCB from being adversely affected by operation of the other;

wherein said shielding plate comprises a heat shielding plate for blocking heat generated in the PCB from reaching the CRT.

13. In the monitor of claim 12, wherein said shielding plate comprises:

a vertical portion engaged to a front portion of the PCB; and a slanted portion connected to the vertical portion and mounted at a certain angle between the PCB and the CRT for blocking at least one of heat generated in the PCB and an arc generated in the CRT.

14. In the monitor of claim 13, wherein said vertical portion has at least one throughhole formed therein, said shielding plate further comprising an engaging screw which passes through the throughhole and which is engaged to an engaging hole formed in a front portion of the PCB so that the shielding plate is integrally engaged to the PCB.

15. In the monitor of claim 13, wherein said shielding plate is formed of a synthetic resin having a certain elastic force.

16. In the monitor of claim 13, wherein said shielding plate further comprises an aluminum plate attached to a lower portion of the shielding plate.

17. In the monitor of claim 12, wherein said shielding plate also prevents an electric arc generated in the CRT from reaching the PCB.

* * * * *